US012130848B1

(12) United States Patent
Koneru et al.

(10) Patent No.: US 12,130,848 B1
(45) Date of Patent: Oct. 29, 2024

(54) SYSTEMS AND METHODS FOR CONVERSATION ORCHESTRATION USING TRAINED LARGE LANGUAGE MODELS

(71) Applicant: KORE.AI, INC., Orlando, FL (US)

(72) Inventors: Rajkumar Koneru, Windermere, FL (US); Prasanna Kumar Arikala Gunalan, Hyderabad (IN); Thirupathi Bandam, Hyderabad (IN); Jayesh Arunkumar Jain, Bhusawal (IN); Vishnu Vardhan Sai Lanka, Medchal Malkajgiri (IN)

(73) Assignee: Kore.ai, Inc., Orlando, FL (US)

( * ) Notice: Subject to any disclaimer, the term of this patent is extended or adjusted under 35 U.S.C. 154(b) by 0 days.

(21) Appl. No.: 18/230,395

(22) Filed: Aug. 4, 2023

(51) Int. Cl.
| | |
|---|---|
| *G10L 15/22* | (2006.01) |
| *G06F 16/332* | (2019.01) |
| *G06F 40/295* | (2020.01) |
| *G06F 40/40* | (2020.01) |
| *G10L 15/18* | (2013.01) |

(52) U.S. Cl.
CPC ........ *G06F 16/3329* (2019.01); *G06F 40/295* (2020.01); *G06F 40/40* (2020.01); *G10L 15/22* (2013.01); *G10L 15/18* (2013.01); *G10L 15/1815* (2013.01); *G10L 15/1822* (2013.01); *G10L 2015/221* (2013.01); *G10L 2015/223* (2013.01); *G10L 2015/225* (2013.01); *G10L 2015/228* (2013.01)

(58) Field of Classification Search
None
See application file for complete search history.

(56) References Cited

U.S. PATENT DOCUMENTS

| | | | | |
|---|---|---|---|---|
| 11,302,310 B1* | 4/2022 | Gandhe | ............... | G10L 15/197 |
| 11,861,263 B1* | 1/2024 | Hunt | ............... | G06F 3/167 |
| 11,868,384 B2* | 1/2024 | Shah | ............... | G06F 16/338 |
| 2023/0074406 A1* | 3/2023 | Baeuml | ............... | G10L 15/183 |

(Continued)

OTHER PUBLICATIONS

Rajasekharan et al., "Reliable Natural Language Understanding with Large Language Models and Answer Set Programming", arXiv:2302.03780v1, Feb. 7, 2023. (Year: 2023).*

*Primary Examiner* — Richard Z Zhu
(74) *Attorney, Agent, or Firm* — Troutman Pepper Hamilton Sanders LLP

(57) ABSTRACT

A virtual assistant server receives conversational inputs as part of a conversation from a customer device and generates a version of a data record of the conversation upon: the receiving of each of the conversational inputs, or receiving each output generated by one of a plurality of software modules when the one of the software modules receives a system input from the conversation management framework. The virtual assistant server provides each of the generated versions of the data record to a communication orchestrator and receives for each of the generated versions of the data record, execution instructions from the communication orchestrator. Further, the virtual assistant server communicates with one or more of the software modules based on the received execution instructions, and provides based on the communicating, one or more of the outputs of the software modules to the customer device, when the one or more of the outputs comprise one or more responses to one or more of the conversational inputs.

21 Claims, 13 Drawing Sheets

(56) References Cited

U.S. PATENT DOCUMENTS

| | | | |
|---|---|---|---|
| 2023/0197070 A1* | 6/2023 | Byrne | G10L 13/02 |
| | | | 704/235 |
| 2023/0274094 A1* | 8/2023 | Tunstall-Pedoe | G06F 40/30 |
| | | | 704/9 |
| 2023/0343323 A1* | 10/2023 | Baeuml | G06F 3/167 |
| 2023/0343324 A1* | 10/2023 | Baeuml | G10L 15/22 |
| 2023/0410801 A1* | 12/2023 | Mishra | H04M 3/5175 |
| 2024/0111960 A1* | 4/2024 | Earle | G06F 40/30 |
| 2024/0203404 A1* | 6/2024 | Shabat | G10L 13/027 |

* cited by examiner

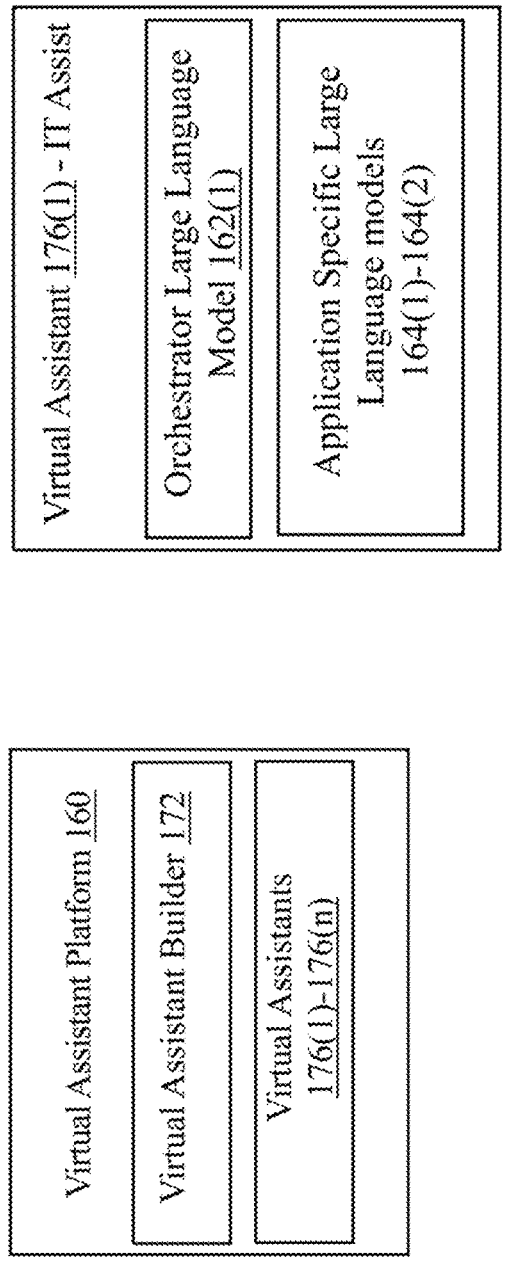

| Training data records 5301(1)-5301(4) | Execution instructions 5301(1)-5301(4) |
|---|---|
| Customer: I need a new laptop | action: <find_usecase_entity> |
| Customer: I need a new laptop<br>Action: <find_usecase_entity><br>Use case: <request_item><br>Entity: laptop | action: <exec_search_catalogue> |
| Customer: I need a new laptop<br>Action: <find_usecase_entity><br>Use case: <request_item><br>Entity: laptop<br>Action: <exec_search_catalogue><br>API Response: <response_search_catalogue> = "Passed"<br>a. Future Inspire 2210 b. Future Inspire 2380 c. BigBook Pro 2453 | action: <generate_response> |
| Customer: I need a new laptop<br>Action: <find_usecase_entity><br>Use case: <request_item><br>Entity: laptop<br>Action: <exec_search_catalogue><br>API Response: <response_search_catalogue> = "Passed"<br>a. Future Inspire 2610 b. Future Inspire 7700 c. BigBook Pro<br>Action: <generate_response><br>Response:<br>The following monitors are available<br>a. Future Inspire 2210 b. Future Inspire 2380 c. BigBook Pro 2453 | action: <prompt_customer> |

Flow description 510

FIG. 5A

NLU LLM Training 540

| Training System Inputs 550(1)-550(2) | Expected Outputs 560(1)-560(2) |
|---|---|
| Given the below conversation transcript and the last customer input, identify all use cases and extract all entities.<br><br>Customer: I need a new laptop | Use case: <request_item><br>Entity: laptop |
| Given the below conversation transcript and the last customer input, identify all use cases and extract all entities.<br><br>Customer: Need a new laptop for my desk<br>Use case: <request_item><br>Entity: monitor<br>Response: Sure, I will fetch the information for you<br>API Response: <response_search_catalogue> = "Passed" a. Future Inspire 7610 b. Future Inspire 7700 c. BigBook Pro 4510<br>Response:<br>Here are the list of laptops available<br>a. Future Inspire 7610<br>b. Future Inspire 7700<br>c. BigBook Pro 4510<br>Customer: BigBook Pro | Use case: NA<br>Entity: BigBook Pro 4510 |

FIG. 5B

Response Generation LLM Training 570

| Training System Inputs 580(1)-580(3) | Expected Outputs 590(1)-590(3) |
|---|---|
| Consider the below conversation transcript and generate a response to present to the customer.<br><br>Customer: I need a new laptop<br>Use case: <request_item><br>Entity: laptop | Response: Sure, I will fetch the information for you |
| Consider the below conversation transcript and generate a response to present to the customer.<br><br>Customer: I need a new laptop<br>Use case: <request_item><br>Entity: laptop<br>Response: Sure, I will fetch the information for you<br>API Response: <response_search_catalogue> – "Passed"<br>a. Future Inspire 7610 b. Future Inspire 7700 c. BigBook Pro | Response:<br>Here are the list of laptops available:<br>a. Future Inspire 7610<br>b. Future Inspire 7700<br>c. BigBook Pro |
| Consider the below conversation transcript and generate a response to present to the customer.<br><br>Customer: Need a new monitor for my desk<br>Use case: <request_item><br>Entity: monitor<br>Response: Sure, I will fetch the information for you<br>API Response: <response_search_catalogue> – "Passed"<br>a. Worldview 2500 b. Imagine 2010 c. Imagine 2020 | Response:<br>Here are the list of monitors available:<br>a. Worldview 2500<br>b. Imagine 2010<br>c. Imagine 2020 |

FIG. 5C

| Step | Data |
|---|---|
| 610 | I need a new monitor |
| 612 | Given the below data record find the next best virtual assistant response<br>Customer: I need a new monitor |
| 614 | Action: <find_usecase_entity> |
| 616 | Given the below conversation transcript and the last customer input, identify all use cases and extract all entities<br>Customer: I need a new monitor |
| 618 | Use case: <request_item>, Entity: monitor |
| 620 | Given the below data record find the next best virtual assistant response<br>Customer: I need a new monitor<br>Action: <find_usecase_entity><br>Use case: <request_item><br>Entity: monitor |
| 622 | Action: <case_search_catalogue> |
| 624 | Use case: <request_item>, entity: monitor |
| 626 | API Response: <response_search_catalogue> = "Passed"<br>Available monitors:<br>a. Future Inspire 2610 b. Future Inspire 3710 |
| 628 | Given the below data record find the next best virtual assistant response<br>Customer: I need a new monitor<br>Action: <find_usecase_entity><br>Use case: <request_item><br>Entity: monitor<br>Action: <case_search_catalogue><br>API Response: <response_search_catalogue> = "Passed"<br>Available monitors:<br>a. Future Inspire 2610 b. Future Inspire 3710 |

FIG. 6C

| Step | Data |
|---|---|
| 630 | action: <generate_response> |
| 632 | Consider the below conversation transcript and generate a response to present to the customer<br><br>Customer: I need a new monitor<br>Use case: <request_item><br>Entity: monitor<br>API Response: <response_search_catalogue>= "Passed"<br>Available monitors:<br>a. Future Inspire 2610 b. Future Inspire 3710 |
| 634 | Response: The following monitors are available a. Future Inspire 2610 b. Future Inspire 3710 |
| 636 | Given the below data record find the next best virtual assistant response<br><br>Customer: I need a new monitor<br>Action: <find_usecase_entity><br>Use case: <request_item><br>Entity: monitor<br>Action: <exec_search_catalogue><br>API Response: <response_search_catalogue>= "Passed"<br>Available monitors:<br>a. Future Inspire 2610 b. Future Inspire 3710<br>Action: <generate_response><br>Response:<br>The following monitors are available a. Future Inspire 2610 b. Future Inspire 3710 |
| 638 | action: <prompt_customer> |
| 640 | The following monitors are available a. Future Inspire 2610 b. Future Inspire 3710 |

FIG. 6D

SYSTEMS AND METHODS FOR CONVERSATION ORCHESTRATION USING TRAINED LARGE LANGUAGE MODELS

FIELD

This technology generally relates to virtual assistants, and more particularly to methods, systems, and computer-readable media for conversation orchestration using trained large language models.

BACKGROUND

Conversational artificial intelligence (AI) systems have become a popular customer touchpoint because of the ease of interaction they offer. Customers can converse with enterprise specific custom virtual assistants in natural language and resolve their issues or find the answers to their queries.

The development and deployment of conversational AI systems includes creating and managing custom virtual assistants. This is a skilled exercise and comprises heavy development costs and lengthy timelines. In real-world scenarios, numerous complex use cases arise that cannot be accomplished by a single language model or system. These use cases often involve a composition of multiple sub-tasks, each requiring specialized expertise and capabilities. In one example, when an information technology (IT) virtual assistant may have the use case as receive order and the sub-tasks associated to fulfill the use case may comprise understanding use case from customer conversational inputs, collecting order information from the conversational inputs, providing messages to the conversational inputs, communicating with an enterprise backend, or the like. Existing conversational AI systems require development of a dialog flow for the use case. The dialog flow requires configuring modules for each sub-task and connecting the configured modules to fulfill the use case. The dialog task developers also need to make sure that the dialog task is configured to respond to every possible variation of the customer conversation.

Huge teams including business analysts, language experts, conversation designers, developers and testers are required to develop and deploy such custom virtual assistants. Further, rigorous development and testing, which often takes months, is required to ensure that the custom virtual assistant converses satisfactorily with customers.

Large Language Models (LLM's) can handle many of these sub-tasks with no or minimal training. However, LLM's despite their remarkable advancements, have their limitations and cannot solely address these multifaceted challenges. The inherent complexity and diversity of fulfilling the use case demands multiple LLM's, other language models or systems working together. However, the state-of-the-art conversational AI systems do not have an efficient collaborative mechanism of various models and systems.

SUMMARY

In one example, the present disclosure relates to a method for conversation orchestration by a conversation management framework of a virtual assistant server. The method comprises: receiving, by a conversation management framework, a plurality of conversational inputs as part of a conversation from a customer device. Further generating, by the conversation management framework, a version of a data record of the conversation upon: the receiving of each of the conversational inputs, or receiving each output generated by one of a plurality of software modules communicatively coupled to the conversation management framework when the one of the software modules receives a system input from the conversation management framework. Further, providing, by the conversation management framework, each of the generated versions of the data record to a communication orchestrator communicatively coupled to the conversation management framework. Further, receiving, by the conversation management framework, for each of the generated versions of the data record, execution instructions from the communication orchestrator. Further, communicating, by the conversation management framework, with one or more of the software modules based on the received execution instructions for each of the generated versions of the data record. Further, providing, by the conversation management framework, based on the communicating, one or more of the outputs of the software modules to the customer device, when the one or more of the outputs comprise one or more responses to one or more of the conversational inputs, wherein at least two or more of the generated versions of the data record comprise: one or more of the conversational inputs, one or more of the execution instructions and one or more of the outputs.

In another example, the present disclosure relates to a virtual assistant server comprising one or more processors and a memory. The memory coupled to the one or more processors which are configured to execute programmed instructions stored in the memory to receive a plurality of conversational inputs as part of a conversation from a customer device. Further a version of a data record of the conversation is generated upon: the receiving each of the conversational inputs; or receiving each output generated by one of a plurality of software modules communicatively coupled to the conversation management framework when the one of the software modules receives a system input from the conversation management framework. Further, each of the generated versions of the data record is provided to a communication orchestrator communicatively coupled to the conversation management framework. Further, for each of the generated versions of the data record, execution instructions from the communication orchestrator are received. Further, one or more of the software modules are communicated with based on the received execution instructions for each of the generated versions of the data record. Further, one or more of the outputs of the software modules to the customer device are provided based on the communicating, when the one or more of the outputs comprise one or more responses to one or more of the conversational inputs, wherein at least two or more of the generated versions of the data record comprise: one or more of the conversational inputs, one or more of the execution instructions and one or more of the outputs.

In another example, the present disclosure relates to a non-transitory computer readable storage medium storing thereon instructions which when executed by one or more processors, causes the one or more processors to receive a plurality of conversational inputs as part of a conversation from a customer device. Further a version of a data record of the conversation is generated upon: the receiving each of the conversational inputs; or receiving each output generated by one of a plurality of software modules communicatively coupled to the conversation management framework when the one of the software modules receives a system input from the conversation management framework. Further, each of the generated versions of the data record is provided to a communication orchestrator communicatively coupled to the conversation management framework. Further, for each of the generated versions of the data record, execution instructions from the communication orchestrator are received. Further, one or more of the software modules are communicated with based on the received execution instructions for each of the generated versions of the data record. Further, one or more of the outputs of the software modules to the customer device are provided based on the communicating, when the one or more of the outputs comprise one or more responses to one or more of the conversational inputs, wherein at least two or more of the generated versions of the data record comprise: one or more of the conversational inputs, one or more of the execution instructions and one or more of the outputs.

BRIEF DESCRIPTION OF THE DRAWINGS

FIG. 1A is a block diagram of an exemplary virtual assistant platform of the virtual assistant server of FIG. 1.

FIG. 1B is a block diagram of an exemplary virtual assistant of the virtual assistant server of FIG. 1.

FIG. 5A is an exemplary table of a flow description used to train an orchestrator LLM of the virtual assistant server of FIG. 1.

FIG. 5B is an exemplary table of training system inputs and corresponding expected outputs used to train a natural language understanding large language model.

FIG. 5C is an exemplary table of training system inputs and corresponding expected outputs used to train a response generation large language model.

FIGS. 6C-6D are exemplary tables illustrating details of the communication of the steps of the sequence diagram of FIG. 6A.

DETAILED DESCRIPTION

Examples of the present disclosure relate to a virtual assistant server environment and, more particularly, to one or more components, systems, computer-readable media and methods for conversation orchestration using trained large language models. The virtual assistant server environment enables developers or administrators of enterprises operating a client device to, by way of example, design, develop, deploy, manage, host, or analyze virtual assistants. A virtual assistant server of the virtual assistant server environment is configured to orchestrate natural language conversations. The one or more developers at one or more developer devices may configure and train the virtual assistants to converse with the customers of the enterprises in natural language. The one or more developers may use different graphical user interfaces (GUIs) provided by the virtual assistant server to configure, train, or test the virtual assistants. The virtual assistant server provides a unified interface for the one or more developers at the one or more developer devices to train the virtual assistants with use cases, entities, or the like.

Enterprises deploy virtual assistants to serve as customer touch points for different use cases. The fulfillment of each use case involves finishing multiple sub-tasks. In the present disclosure, the virtual assistant server uses a hub and spoke architecture for orchestrating conversations to fulfill use cases. The virtual assistant server comprises a plurality of orchestrator large language models which orchestrate the customer conversations, a conversation management framework which provides inputs to the plurality of orchestrator large language models and coordinates with components, modules, or processes such as application specific large language models, Application Programming Interface (API) adapters, script nodes, or the like, based on the outputs of the plurality of orchestrator large language models. The different components of the virtual assistant server execute or manage the execution of different sub-tasks of the use cases.

Figure 1:
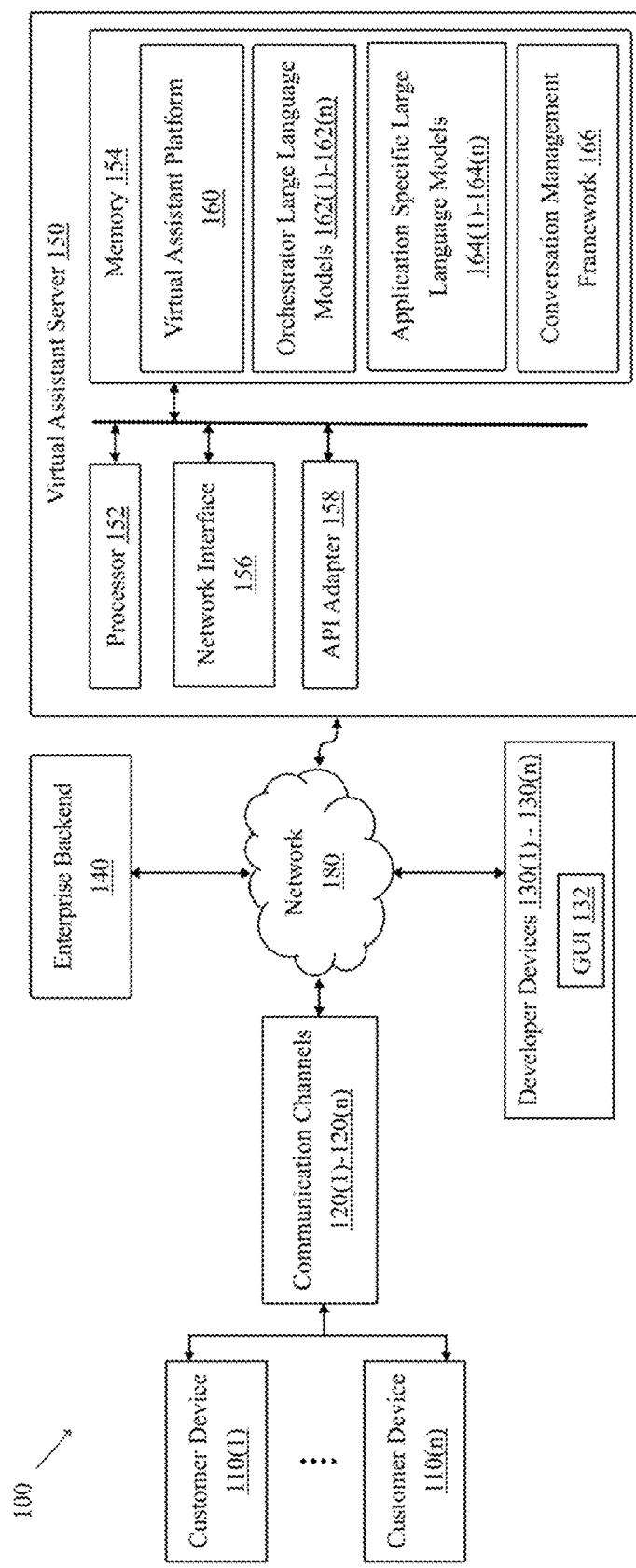
FIG. 1 is a block diagram of an exemplary virtual assistant server environment for implementing the concepts and technologies disclosed herein.

FIG. 1 is a block diagram of an exemplary virtual assistant server environment 100 for implementing the concepts and technologies disclosed herein. The environment 100 includes: one or more customer devices 110(1)-110(n), one or more communication channels 120(1)-120(n), one or more developer devices 130(1)-130(n), an enterprise backend 140, and a virtual assistant server 150 coupled together via a network 180, although the environment 100 can include other types and numbers of systems, devices, components, and/or elements and in other topologies and deployments. While not shown, the exemplary environment 100 may additionally comprise: databases, cloud based or on-premises servers, network components, such as routers, switches and other devices, which are well known to those of ordinary skill in the art and thus will not be described here.

The one or more customer devices 110(1)-110(n) may comprise any type of computing device that can facilitate user interaction, for example, a desktop computer, a laptop computer, a tablet computer, a smartphone, a mobile phone, a wearable computing device, or any other type of digital device with communication and data exchange capabilities. The one or more customer devices 110(1)-110(n) may include software and hardware capable of communicating with the virtual assistant server 150 via the network 180. The customers accessing the one or more customer devices 110(1)-110(n) provide conversational inputs (e.g., in text or voice) to the virtual assistant server 150 and the virtual assistant server 150 provides responses to the conversational inputs. In one example, the virtual assistant server 150 communicates with the enterprise backend 140 to provide responses to the conversational inputs.

The customers at the one or more customer devices 110(1)-110(n) may interact with the virtual assistant server 150 via the network 180 by providing conversational inputs such as a text input, a voice input, or a combination of text and voice inputs via the one or more communication channels 120(1)-120(n). The one or more communication channels 120(1)-120(n) may include channels such as, enterprise messengers (e.g., Kore.ai WorkAssist Chat, Skype for Business, Microsoft Teams, Slack, Google Hangouts, or the like), social messengers (e.g., Facebook Messenger, WhatsApp Business Messaging, Twitter, Lines, Telegram, or the like), web and mobile channels (e.g., a web application, a mobile application), interactive voice response (IVR) channels, voice channels (e.g., Google Assistant, Amazon Alexa, or the like), live chat channels (e.g., LivePerson, LiveChat, Zendesk Chat, Zoho Desk, or the like), a webhook channel, a short messaging service (SMS), email, a software-as-a-service (SaaS) application, voice over internet protocol (VOIP) calls, computer telephony calls, or the like. It may be understood that to support voice-based communication channels, the environment 100 may include, for example, a public switched telephone network (PSTN), a voice server, a text-to-speech (TTS) engine, and/or an automatic speech recognition (ASR) engine which are not shown in the FIG. 1.

The one or more developer devices 130(1)-130(n) may communicate with the virtual assistant server 150 via the network 180. The one or more developers at the one or more developer devices 130(1)-130(n) may access and interact with the functionalities exposed by the virtual assistant server 150 via the one or more developer devices 130(1)-130(n). The one or more developer devices 130(1)-130(n) may include any type of computing device that can facilitate user interaction, for example, a desktop computer, a laptop computer, a tablet computer, a smartphone, a mobile phone, a wearable computing device, or any other type of device with communication and data exchange capabilities. The one or more developer devices 130(1)-130(n) may include software and hardware capable of communicating with the virtual assistant server 150 via the network 180. Also, the one or more developer devices 130(1)-130(n) may render and display the information received from the virtual assistant server 150, by way of example, to render an interface which the one or more developers at the one or more developer devices 130(1)-130(n) may use to configure one or more virtual assistants. The one or more developer devices 130(1)-130(n) and the virtual assistant server 150 may communicate via one or more application programming interfaces (APIs) or one or more hyperlinks exposed by the virtual assistant server 150, although other types and/or numbers of communication methods may be used in other configurations.

Also, the one or more developer devices 130(1)-130(n) render and display data received from the virtual assistant server 150 in a graphical user interface 132. The one or more developer devices 130(1)-130(n) may run applications, such as web browsers or virtual assistant software, which may render the GUI 132, although other types and/or numbers of applications may render the GUI 132 in other configurations. In one example, the one or more developers at the one or more developer devices 130(1)-130(n) may, by way of example, make selections, provide inputs using the GUI 132 or interact, by way of example, with data, icons, widgets, or other components displayed in the GUI 132.

The enterprise backend 140 supports and manages the backend operations of an enterprise. The enterprise backend 140 handles the business logic, data management, and integration with external systems. The enterprise backend 140 comprises components such as an application server, a database management system, a business logic layer, APIs/web services, messaging/integration components, and security/authentication mechanisms, although the enterprise backend 140 may comprise other types and/or numbers of components in other configurations. The enterprise backend 140 communicates with external systems through RESTful APIs, SOAP, message queues, although the enterprise backend 140 may use other types and/or numbers of means for communication in other configurations. These communication means facilitate data exchange, trigger actions, and enable seamless integration with external systems, supporting efficient enterprise operations. The virtual assistant server 150 may communicate with the enterprise backend 140 to provide or retrieve enterprise data, business rules, customer data, although other types and/or numbers of data or information may be retrieved in other configurations.

The virtual assistant server 150 includes a processor 152, a memory 154, a network interface 156, and an API adapter 158, although the virtual assistant server 150 may include other types and/or numbers of components in other configurations. In addition, the virtual assistant server 150 may include an operating system (not shown). In one example, the virtual assistant server 150, one or more components of the virtual assistant server 150, and/or one or more processes performed by the virtual assistant server 150 may be implemented using a networking environment (e.g., cloud computing environment). In one example, the capabilities of the virtual assistant server 150 may be offered as a service using the cloud computing environment.

The components of the virtual assistant server 150 may be coupled by a graphics bus, a memory bus, an Industry Standard Architecture (ISA) bus, an Extended Industry Standard Architecture (EISA) bus, a Micro Channel Architecture (MCA) bus, a Video Electronics Standards Association (VESA) Local bus, a Peripheral Component Interconnect (PCI) bus, a PCI-Express (PCIe) bus, a serial advanced technology attachment (SATA) bus, a Personal Computer Memory Card Industry Association (PCMCIA) bus, an Small Computer Systems Interface (SCSI) bus, or a combination of two or more of these, although other types and/or numbers of buses may be used in other configurations.

The processor 152 of the virtual assistant server 150 may execute one or more computer-executable instructions stored in the memory 154 for the methods illustrated and described with reference to the examples herein, although the processor may execute other types and numbers of instructions and perform other types and numbers of operations. The processor 152 may comprise one or more central processing units (CPUs), or general-purpose processors with a plurality of processing cores, such as Intel® processor(s), AMD® processor(s), although other types of processor(s) could be used in other configurations.

The memory 154 of the virtual assistant server 150 is an example of a non-transitory computer readable storage medium capable of storing information or instructions for the processor 152 to operate on. The instructions, which when executed by the processor 152, perform one or more of the disclosed examples. In one example, the memory 154 may be a random access memory (RAM), a dynamic random access memory (DRAM), a static random access memory (SRAM), a persistent memory (PMEM), a nonvolatile dual in-line memory module (NVDIMM), a hard disk drive (HDD), a read only memory (ROM), an erasable programmable read-only memory (EPROM), an electrically erasable programmable read-only memory (EEPROM), a programmable ROM (PROM), a flash memory, a compact disc (CD), a digital video disc (DVD), a magnetic disk, a universal serial bus (USB) memory card, a memory stick, or a combination of two or more of these. It may be understood that the memory 154 may include other electronic, magnetic, optical, electromagnetic, infrared or semiconductor based non-transitory computer readable storage medium which may be used to tangibly store instructions, which when executed by the processor 152, perform the disclosed examples. The non-transitory computer readable medium is not a transitory signal per se and is any tangible medium that contains and stores the instructions for use by or in connection with an instruction execution system, apparatus, or device. Examples of the programmed instructions and steps stored in the memory 154 are illustrated and described by way of the description and examples herein.

As illustrated in FIG. 1, the memory 154 hosts, manages, and/or provides a virtual assistant platform 160, orchestrator large language models 162(1)-162(n) (hereinafter referred to as orchestrator LLMs 162(1)-162(n)), application specific large language models 164(1)-164(n) (hereinafter referred to as application specific LLMs 164(1)-164(n)), and a conversation management framework 166, although other types and/or numbers of instructions in the form of programs, functions, methods, procedures, definitions, subroutines, or modules may be stored. The virtual assistant server 150 receives communication from the one or more developer devices 130(1)-130(n) and provides a response to the communication. The virtual assistant server 150 also receives communication from the one or more customer devices 110(1)-110(n) of the enterprise customers and provides a response to the communication.

The virtual assistant platform 160 hosts, manages, and/or provides user interfaces to develop, train, and/or deploy virtual assistants. The virtual assistant platform 160 also hosts, manages, and/or provides the virtual assistants deployed by the enterprises and accessed by the customers. Further, the virtual assistant platform 160 hosts, manages, and/or provides the natural language processing function of the virtual assistants developed using the user interfaces deployed by the enterprises and accessed by the customers.

Each of the orchestrator LLMs 162(1)-162(n) is a large language model which orchestrates a customer conversation. In one example, the orchestrator LLM 162(1) receives conversational inputs from the conversation management framework 166 and provides outputs to the conversation management framework 166. The conversation management framework 166 directs the customer conversation based on the outputs received from the orchestrator LLM 162(1). The orchestrator LLM 162(1) may be trained using a flow description comprising versions of training data records and corresponding execution instructions. The versions of the training data records may correspond to one or more conversations. In one example, the orchestrator LLM 162(1) may be trained using versions of the training data records of conversation(1)-conversation(n). Each of the virtual assistants 176(1)-176(n), described and illustrated further below with reference to FIG. 1A, comprises one of the orchestrator LLMs 162(1)-162(n).

The application specific LLMs 164(1)-164(n) are large language models trained to perform a particular application. The applications may be natural language understanding including use case recognition or named entity recognition, response generation, prompt generation, content summarization, or code generation, although the application specific LLMs 164(1)-164(n) may be trained to perform other types and/or numbers of applications in other configurations. The application specific LLMs 164(1)-164(n) are fine-tuned on specific datasets related to the target application, described and illustrated below, for example, with reference to FIG. 5B and FIG. 5C, enabling application specific LLMs 164(1)-164(n) to accurately perform tasks related to the target application.

The application specific LLMs 164(1)-164(n) are large language models or other types of machine learning models that typically use deep learning or neural networks to learn language features or other skills from large amounts of data. The application specific LLMs 164(1)-164(n) are usually trained on datasets and then used to generate predictions or generate features from unseen data. The application specific LLMs 164(1)-164(n) may be used to generate language features such as word embeddings, part-of-speech tags, named entity recognition, sentiment analysis, or the like. In one example, the application specific LLMs 164(1)-164(n) may be hosted, managed, and/or provided by an external server (not shown), and the virtual assistant server 150 may communicate with the external server using application programming interfaces (API's), although other types and/or numbers of communication methods may be used in other configurations.

In one example, the application specific LLMs 164(1) may determine use cases (e.g., intents) of one or more conversational inputs by leveraging natural language processing (NLP) techniques. The application specific LLM 164(1) may use a variety of techniques such as part-of-speech (POS) tagging, dependency parsing, named entity recognition (NER), and semantic analysis to determine the use case and the context of the conversational inputs. By using these techniques, the application specific LLM 164(1) can determine the underlying use case of the conversational inputs such as "check balance," "transfer funds," "make payment," or the like. The use case of a conversational input is a textual representation of what the customer wants the virtual assistant to do. The one or more entities in the conversational input are, for example, parameters, fields, data, or words required by the virtual assistant to fulfill the use case. For example, in the customer conversational input-"Book me a flight to Orlando for next Sunday," the use case is "Book Flight", and the entities are "Orlando" and "Sunday."

The virtual assistant server 150 may fine-tune the application specific LLMs 164(1)-164(n) using training system inputs. In one example, the developers may fine-tune the application specific LLMs 164(1)-164(n) using the training system inputs or other information provided by the developers. Each of the virtual assistants 176(1)-176(n), described and illustrated below with reference to FIG. 1A, comprises one or more of the application specific LLMs 164(1)-164(n). In another example, each of the virtual assistants 176(1)-176(n) is communicatively coupled with one or more of the application specific LLMs 164(1)-164(n).

The conversation management framework 166 provides versions of data records to the orchestrator LLMs 162(1)-162(n) and manages customer conversations by interacting with the application specific LLMs 164(1)-164(n), the API adapter 158, and the customer devices 110(1)-110(n) based on the outputs received from the orchestrator LLMs 162(1)-162(n). The conversation management framework 166 is configured to communicate with the customer devices 110(1)-110(n), the orchestrator LLMs 162(1)-162(n), the application specific LLMs 164(1)-164(n), and the API adapter 158 in their corresponding input and output formats. In one example, the conversation management framework 166 is configured to generate and provide a system input that comprises: a conversation transcript and a prompt to the NLU LLM 164(1), and understand the output of the NLU LLM 164(1) comprising one or more use cases or one or more entities, for example. In this example, the prompt comprises an instruction, a question, or a statement given to a large language model to guide the large language model in the generation of text, although other types and/or numbers of information may be included in the prompt. The conversation transcript comprises: one or more conversational inputs received by the virtual assistant server 150, one or more outputs of software modules, or one or more responses to the one or more conversational inputs, although other types and/or numbers of information may be included in the conversation transcript. The data record comprises: one or more conversational inputs received by the virtual assistant server 150, one or more outputs of the software modules, one or more execution instructions output by the orchestrator LLM, or one or more responses to the one or more conversational inputs, although other types and/or numbers of information may be included in the conversation transcript. The software modules comprise: the application specific LLMs 164(1)-164(n) and the API adapter 158, although the software modules may comprise other types and/or numbers of modules in other configurations. The conversation management framework 166 also allows integration of other large language models to the virtual assistant server 150 to support new use cases or enhance the existing use cases defined using the virtual assistant platform 160.

The network interface 156 may include hardware, software, or a combination of hardware and software, enabling the virtual assistant server 150 to communicate with the components illustrated in the environment 100, although the network interface 156 may enable communication with other types and/or number of components in other configurations. In one example, the network interface 156 provides interfaces between the virtual assistant server 150 and the network 180. The network interface 156 may support wired or wireless communication. In one example, the network interface 156 may include an Ethernet adapter or a wireless network adapter to communicate with the network 180.

The API adapter 158 manages web requests and responses between the virtual assistant server 150 and the enterprise backend 140. The API adapter 158 is configured to receive data from the conversation management framework 166 and make one or more API calls to the enterprise backend 140 based on the received data, although the API adapter 158 may be configured to make API calls to other types and/or numbers of endpoints in other configurations. In one example, the API adapter 158 comprises code to convert the data received from the conversation management framework 166 into a payload for an API used to connect with the enterprise backend 140. Also, the configuration added by the developer to a service call node 360, further described and illustrated below with reference to FIG. 3B, may be used by the API adapter 158 to connect to the enterprise backend 140. In another example, the API adapter 158 comprises code to call one or more predefined functions based on the data received from the conversation management framework 166. The API adapter 158 may enable interoperability between the virtual assistant server 150 and one or more external systems.

The network 180 enables the customer devices 110(1)-110(n), the developer devices 130(1)-130(n), the enterprise backend 140, or other external systems to communicate with the virtual assistant server 150. The network 180 may be, for example, an ad hoc network, an extranet, an intranet, a wide area network (WAN), a virtual private network (VPN), a local area network (LAN), a wireless LAN (WLAN), a wireless WAN (WWAN), a metropolitan area network (MAN), internet, a portion of the internet, a portion of the public switched telephone network (PSTN), a cellular telephone network, a wireless network, a Wi-Fi network, a worldwide interoperability for microwave access (WiMAX) network, or a combination of two or more such networks, although the network 180 may include other types and/or numbers of networks in other topologies or configurations.

The network 180 may support protocols such as Session Initiation Protocol (SIP), Hypertext Transfer Protocol (HTTP), Hypertext Transfer Protocol Secure (HTTPS), Media Resource Control Protocol (MRCP), Real Time Transport Protocol (RTP), Real-Time Streaming Protocol (RTSP), Real-Time Transport Control Protocol (RTCP), Session Description Protocol (SDP), Web Real-Time Communication (WebRTC), Transmission Control Protocol/Internet Protocol (TCP/IP), User Datagram Protocol (UDP), or Voice over Internet Protocol (VOIP), although other types and/or numbers of protocols may be supported in other topologies or configurations. The network 180 may also support standards and/or formats such as, for example, hypertext markup language (HTML), extensible markup language (XML), voiceXML, call control extensible markup language (CCXML), JavaScript object notation (JSON), although other types and/or numbers of data, media, and document standards and formats may be supported in other topologies or configurations. The network interface 156 of the virtual assistant server 150 may include any interface that is suitable to connect with any of the above-mentioned network types and communicate using any of the above-mentioned network protocols.

FIG. 1A is a block diagram of an exemplary virtual assistant platform 160 of the virtual assistant server 150 of FIG. 1. In this example, the virtual assistant platform 160 comprises instructions or data corresponding to a virtual assistant builder 172, a natural language processing (NLP) engine 174, and virtual assistants 176(1)-176(n), although other types and/or numbers of instructions or data in the form of programs, functions, methods, procedures, definitions, subroutines, modules, or structured or unstructured text, may be hosted, managed, and/or provided. Examples of the steps or functions performed when the programmed instructions hosted, managed, and/or provided by the memory 154 are executed are illustrated and described by way of the figures and description associated with the examples herein.

The virtual assistant builder 172 of the virtual assistant platform 160 may be hosted, managed, and/or provided by the virtual assistant server 150 and may be accessible as a website, a web application, or a software-as-a-service (SaaS) application. Enterprise users, such as a developer or a business analyst by way of example, may access the functionality of the virtual assistant builder 172, for example, using web requests, application programming interface (API) requests, although the functionality of the virtual assistant builder 172 may be accessed using other types and/or numbers of methods in other configurations. The developers at the developer devices 130(1)-130(n) may design, create, configure, or train the virtual assistants 176(1)-176(n) using the GUI 132 provided by the virtual assistant builder 172. In one example, the functionality of the virtual assistant builder 172 may be exposed in the GUI 132 rendered in a web page in a web browser accessible using the developer devices 130(1)-130(n), such as a desktop or a laptop by way of example. The developers at the developer devices 130(1)-130(n) may interact with user interface (UI) components, such as windows, tabs, or icons of the GUI 132 rendered in the developer devices 130(1)-130(n), to create the virtual assistants 176(1)-176(n).

The developers at the developer devices 130(1)-130(n) may use the UI components, code, or a combination of these provided in the GUI 132 to create, deploy, or manage the virtual assistants 176(1)-176(n). After the virtual assistants 176(1)-176(n) are deployed, the customers of the enterprise may communicate with the virtual assistants 176(1)-176(n) to, for example, purchase products, raise complaints, access services provided by the enterprise, or to know information about the services offered by the enterprise. Each virtual assistant of the virtual assistants 176(1)-176(n) may be configured with use cases for handling customer utterances and each use case may be further defined using pathless dialog flows. The prior art systems, in contrast, comprise dialog flows in which nodes are connected with each other creating multiple and complex paths. The dialog flows which when executed would traverse through one or more of these paths to fulfill the use cases of the dialog flows. The disadvantage with these systems is that the dialog flows are static, rigid, and cannot cover all variations of the customer conversations. However, the pathless dialog flow technology described herein uses the orchestrator LLMs 162(1)-162(n) for conversation navigation and overcomes the necessity to create paths in the dialog flows. In one example, each of the virtual assistants 176(1)-176(n) may be configured using other methods, such as software code in other configurations.

The virtual assistant builder 172 enables developers to configure the virtual assistants 176(1)-176(n) with different LLMs or other machine learning based models hosted, managed and/or provided by the virtual assistant server 150. In another example, the virtual assistant builder 172 enables developers to configure the virtual assistants 176(1)-176(n) with different LLMs or other machine learning based models hosted, managed and/or provided by a third-party entity external to the virtual assistant server 150.

For creating each of the virtual assistants 176(1)-176(n), the developer using the virtual assistant builder 172 may configure: pathless dialog flows for use cases; training inputs such as: use case labels, out-of-domain use case labels, one or more utterances corresponding to each use case label, versions of training data records and corresponding outputs, business rules, domain knowledge, description of one or more entities, or flow description; nodes—for example, orchestrator node, application specific LLM node, service calls, agent transfer; although the developers may configure virtual assistants 176(1)-176(n) with other types and/or numbers of configurations. The developer may provide such configurations using drag and drop icons provided in the GUI 132, or in the form of text, structured text, code, or the like.

Each of the virtual assistants 176(1)-176(n) comprises an associated virtual assistant configuration, one of the orchestrator LLMs 162(1)-162(n), one or more of the application specific LLMs 164(1)-164(n), or other configuration either provided by the developer or created by the virtual assistant server 150. Based on the training inputs provided by the developer for each of the virtual assistants 176(1)-176(n), the virtual assistant server 150 may fine-tune the one of the orchestrator LLMs 162(1)-162(n) or the one or more of the application specific LLMs 164(1)-164(n). The virtual assistant server 150 may provide the responses received from one or more of the application specific LLMs 164(1)-164(n) to the customer devices 110(1)-110(n) as responses to the conversational inputs.

The virtual assistant server 150 may communicate with one or more external databases or customer relationship management (CRM) software to retrieve customer information to provide responses to customers. In one example, the one or more databases or the CRM software may be hosted by the virtual assistant server 150. The conversation management framework 166 may use the API adapter 158 to communicate with such systems external to the virtual assistant server 150.

FIG. 1B is a block diagram of an exemplary virtual assistant 176(1) of the virtual assistant server 150 of FIG. 1. In this example, the virtual assistant 176(1)—hereinafter referred to as IT assist 176(1) comprises: the orchestrator LLM 162(1); the application specific LLM 164(1)—hereinafter referred to as the Natural Language Understanding (NLU) LLM 164(1); and the application specific LLM 164(2)—hereinafter referred to as the response generation LLM 164(2), although the IT assist 176(1) may comprise other types and/or numbers of components in other configurations.

Figure 2:
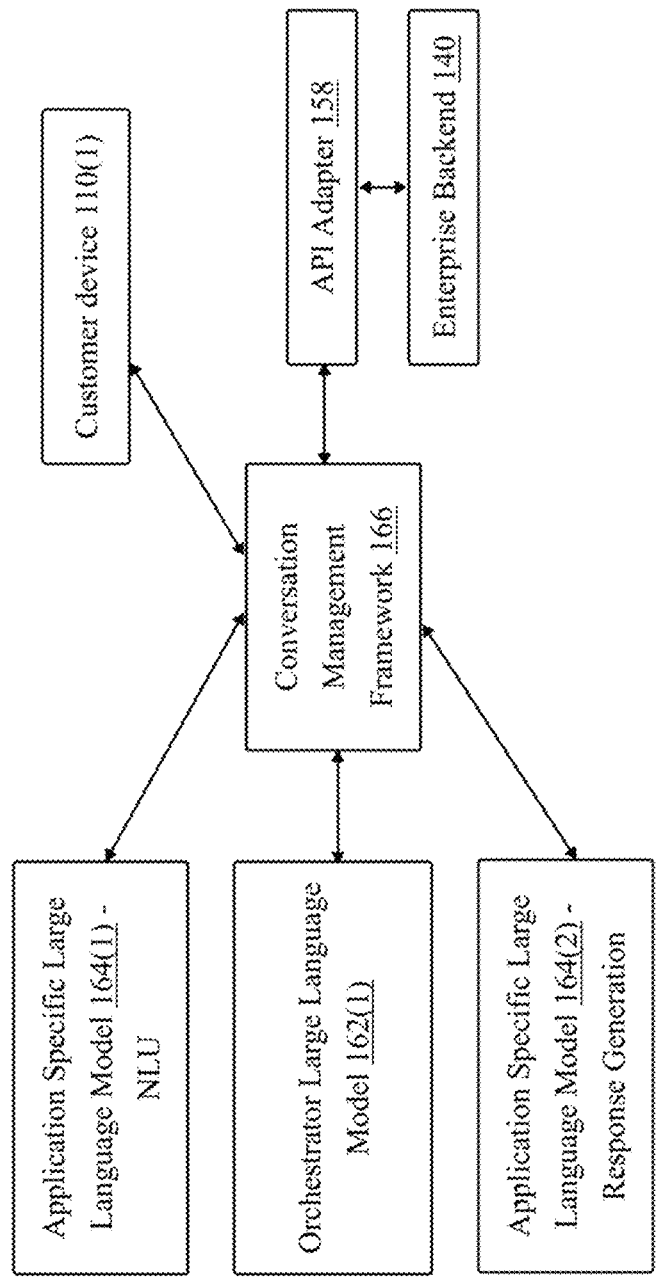
FIG. 2 is a block diagram of an exemplary communication architecture of the virtual assistant-IT Assist of FIG. 1B.

FIG. 2 is a block diagram of an exemplary communication architecture of the virtual assistant-IT assist 176(1) of FIG. 1B. In this example, IT assist 176(1) comprises the orchestrator LLM 162(1), the NLU LLM 164(1) and the response generation LLM 164(2). The conversation management framework 166 is communicatively coupled to the orchestrator LLM 162(1), the NLU LLM 164(1), the response generation LLM 164(2), and the API adapter 158. The conversation management framework 166 receives the conversational inputs from, for example, the customer device 110(1) via the virtual assistant server 150. The conversation management framework 166 provides the conversational inputs received from the customer device 110(1) to the orchestrator LLM 162(1) and based on the output received from the orchestrator LLM 162(1) communicates with the NLU LLM 164(1), the response generation LLM 164(2), or the API adapter 158, although the conversation management framework 166 may communicate with other types and/or numbers of components in other configurations. Once the responses to the conversational inputs are received, the conversation management framework 166 provides the responses to the customer device 110(1).

Figure 3A:
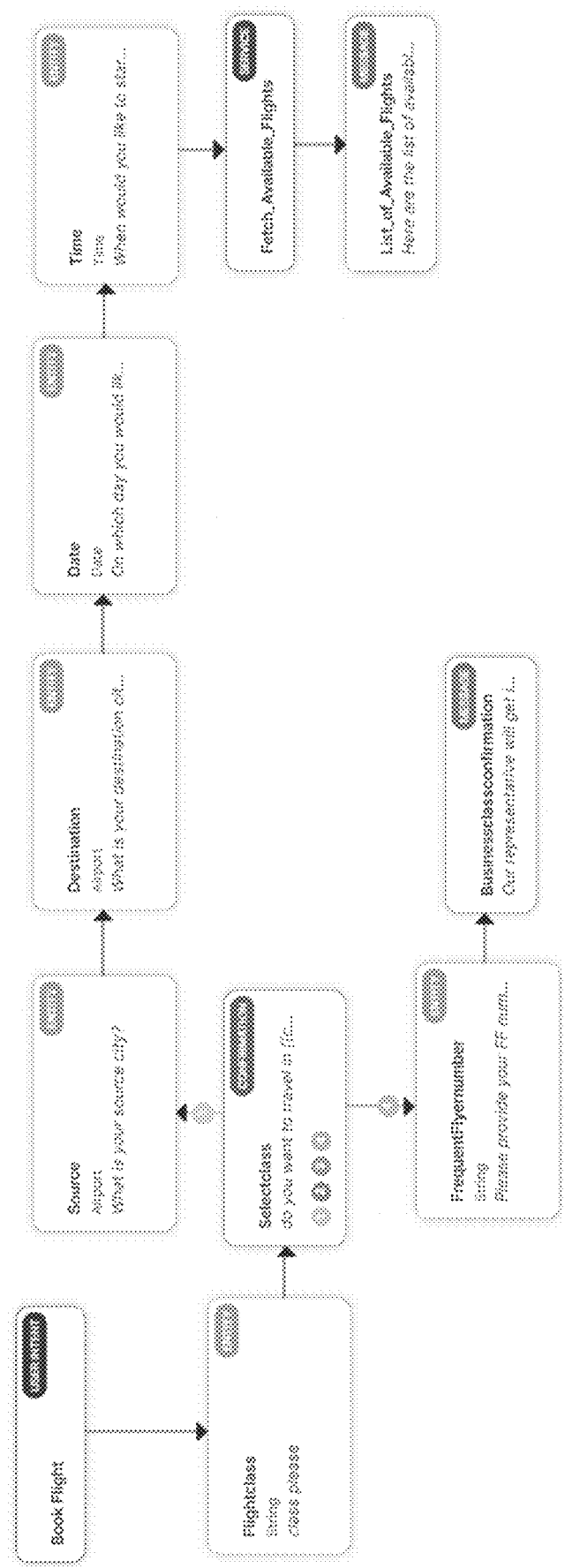
FIG. 3A is an example screenshot of a prior art dialog flow comprising multiple nodes connected with each other forming multiple paths.

FIG. 3A is an example screenshot of a prior art dialog flow comprising multiple nodes connected with each other forming multiple paths. The multiple nodes comprise: an intent node—to determine customer intent; entity nodes—to request information required to fulfill the customer intent; a confirmation node—to request a yes/no answer from the customer; a service node—to make web requests, and message nodes—to provide messages to the customer devices. Based on the use case, to create the dialog flow, the developer selects these multiple nodes from a node library and connects the multiple nodes over the multiple paths so that the execution of the dialog flow fulfills the use case. Each of these nodes needs to be individually configured by the developer. This is a time consuming and a difficult task and includes multiple development and testing iterations before deployment. For example, when designing the dialog flow of a use case-transfer funds, at an information request stage of the dialog flow-"do you want transfer funds", the developer may have designed a path of the dialog flow to take for a 'yes" response from the customer, the developer may have designed a path of the dialog flow to take for a "no" response from the customer. However, the developer may have missed the path of the dialog flow for a "schedule transfer" response from the customer. In this example, the developer needs to perform another iteration of development and test whether the dialog flow outputs expected results for different variations of conversational inputs from the customers. The developer must consider all such variations at all the different stages of the customer conversation and design the virtual assistant conforming to the enterprise rules. As it is likely that certain variations of the conversations may not have been designed for, the customers experience lower satisfaction levels, and the enterprise may lose customers and revenue.

Figure 3B:
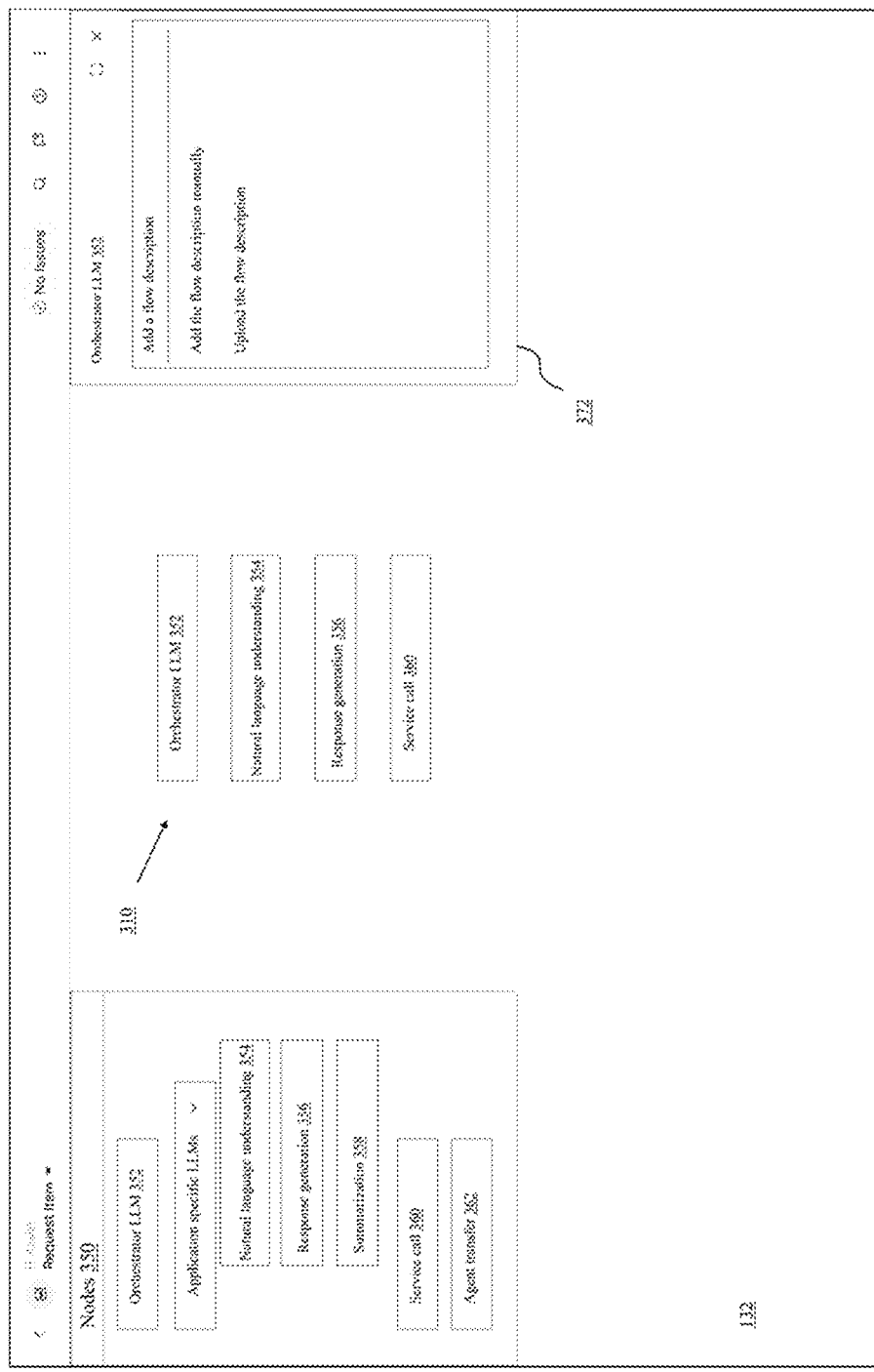
FIG. 3B is an example screenshot of a pathless dialog flow of a "request item" use case of IT assist rendered in a graphical user interface and provided by the virtual assistant server of FIG. 1.

FIG. 3B is an example screenshot of the pathless dialog flow of a "request item" use case of the IT assist 176(1) rendered in the GUI 132 and provided by the virtual assistant server 150. The GUI 132 of the virtual assistant builder 172 comprises options to build and train use cases of the IT assist 176(1), although the GUI 132 of the virtual assistant builder 172 may comprise other types and/or numbers of options in other configurations. The developer at the developer device 130(1) may use one or more of the plurality of nodes 350 to create a pathless dialog flow 310 of the request item use case of the IT assist 176(1) via drag-and-drop mechanism or click to add mechanism, although the developer may use other types and/or numbers of nodes or configuration mechanisms in other configurations.

In this example, to configure the request item use case, the developer selects from the nodes 350—the orchestrator LLM node 352, the NLU LLM node 354, the response generation node 356, and a service call node 360, and adds the selected nodes to the pathless dialog flow 310 of the request item use case. The orchestrator LLM node 352 enables the configuration of the orchestrator LLM 162(1), the NLU LLM node 354 enables the configuration of the NLU LLM 164(1), and the response generation node 356 enables the configuration of the response generation LLM 164(2). The developer configures each of these selected nodes by providing training or by adding configuration information. For example, as illustrated in the panel 372, the orchestrator LLM 162(1) may be trained using the orchestrator LLM node 352 using a flow description comprising versions of training data records and corresponding execution instructions to be output by the orchestrator LLM node 352, although the flow description may comprise other types and/or numbers of data in other configurations. In one example, the versions of the training data records correspond to multiple conversations.

Figure 4:
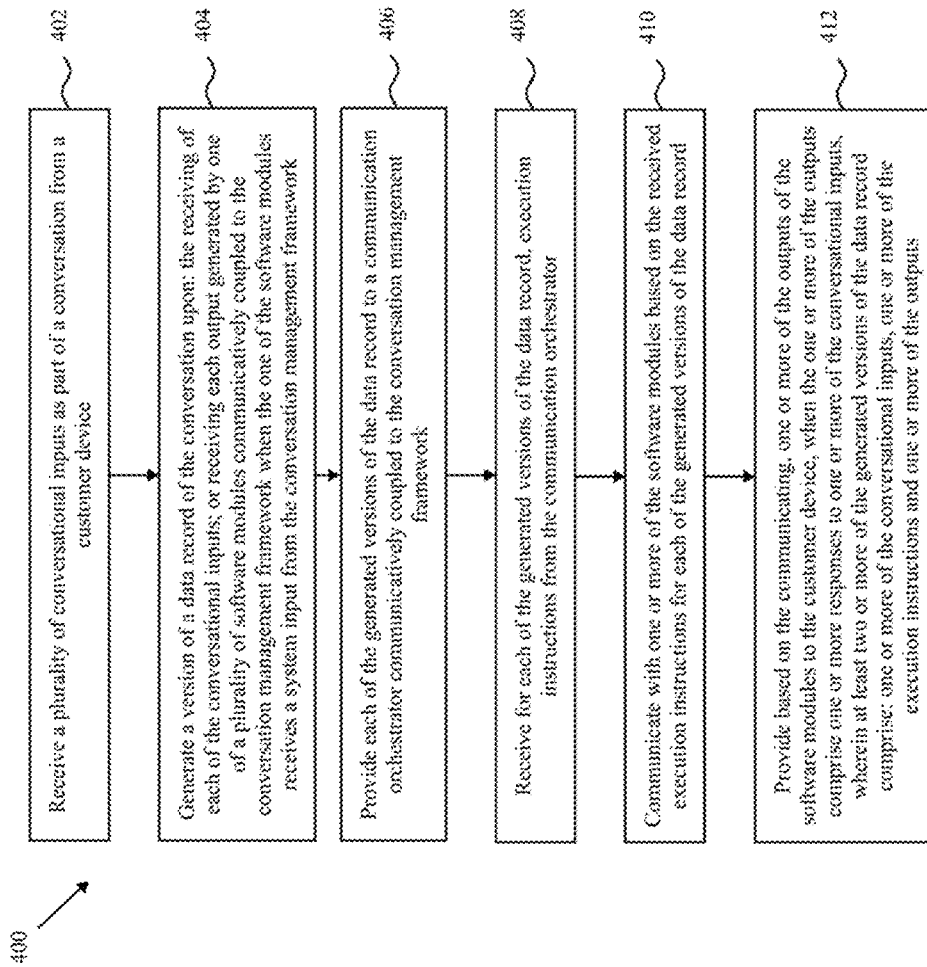
FIG. 4 is a flowchart of an exemplary method for orchestrating a conversation by the virtual assistant server of FIG. 1.

FIG. 4 is a flowchart of an exemplary method 400 for orchestrating a conversation by the virtual assistant server 150. In one example, the customer (in this example—an enterprise user) converses with the IT assist 176(1) to request an item, raise a ticket, or the like. At step 402, the conversation management framework 166 receives a plurality of conversational inputs as part of a conversation from a customer device 110(1).

At step 404, the conversation management framework 166 generates a version of a data record of the conversation upon receiving: the receiving of each of the conversational inputs, or receiving each output generated by one of a plurality of software modules—the NLU LLM 164(1), the response generation LLM 164(2), or the API adapter 158 communicatively coupled to the conversation management framework 166 when the one of the software modules receives a system input from the conversation management framework, although the versions of the data record may be generated upon receiving other types and/or numbers inputs in other configurations. The system inputs are generated and provided by the conversation management framework 166 to the software modules. In one example, the conversation management framework 166 sends a system input comprising a prompt and a conversation transcript to the response generation LLM 164(2).

At step 406, the conversation management framework 166 provides each of the generated versions of the data record to a communication orchestrator-which in this example is the orchestrator LLM 162(1). The orchestrator LLM 162(1) is communicatively coupled to the conversation management framework 166. The orchestrator LLM 162(1) is trained using a flow description 510 comprising versions of the training data records and the corresponding execution instructions.

FIG. 5A is an exemplary table of the flow description 510 used to train the orchestrator LLM 162(1) of the virtual assistant server 150 of FIG. 1. In this example, the flow description 510 comprises versions of the training data record 520(1)-520(4) and the corresponding execution instructions 530(1)-530(4), although the flow description 510 may comprise other types and/or numbers of fields, versions of the training data record, and corresponding execution instructions in other configurations. In one example, the developer may provide the flow description 510 to the virtual assistant server 150 to train the orchestrator LLM 162(1) using the panel 372 of the GUI 132 as illustrated in FIG. 3B.

The execution instructions may comprise tags such as-action: <find_usecase_entity>, action: <exec_search_catalogue>, action: <action: <generate_response>, action: <prompt_customer>, although the execution instructions may comprise other types and/or numbers of tags or other data in other configurations. The conversation management framework 166 is configured to communicate with the software modules based on the execution instructions. In one example, upon receiving the execution instruction-<find_usecase_entity>, the conversation management framework 166 is configured to send the system input comprising a conversation transcript and the prompt-"Given the below conversation transcript and the last customer input, identify all use cases and extract all entities," to the NLU LLM 164(1). The conversation management framework 166 may be configured to generate such communication using software code written in one or more programming languages, although such communication may be generated using other types and/or numbers of methods in other configurations. The developer using the GUI 132 may configure the prompts to be sent to the NLU LLM 164(1), the response generation LLM 164(2), or the orchestrator LLM 162(1), although the developer may configure other types and/or numbers of prompts in other configurations.

Referring back to FIG. 4, at step 408, the conversation management framework 166 receives for each of the generated versions of the data record, execution instructions from the communication orchestrator—the orchestrator LLM 162(1).

At step 410, the conversation management framework 166 communicates with one or more of the software modules based on the received execution instructions for each of the generated versions of the data record. In one example, the software module-NLU LLM 164(1) receives the system input-"Given the below conversation transcript and the last customer input, identify all use cases and extract all entities. Customer: I need a new laptop," and provides an output-"Use case: <request_item>, Entity: laptop" to the conversation management framework 166. Similarly, the response generation LLM 164(2) or the API adapter 158 may provide one or more outputs based on the system inputs received from the conversation management framework 166. In one example, the system input provided to the API adapter 158 may comprise intent or entity details determined by the NLU LLM 164(1) and may not comprise a prompt or a conversation transcript.

At step 412, the conversation management framework 166 provides based on the communicating, one or more outputs of the software modules to the customer device, when the one or more of the outputs comprise one or more responses to one or more of the conversational inputs. At least two or more of the generated versions of the data record comprises: one or more of the conversational inputs, one or more of the execution instructions and one or more of the outputs. In one example, the conversation management framework 166 may determine that each output received from the software module-response generation LLM 164(2) comprises a response to the corresponding conversational input. In another example, the conversation management framework 166 may determine if the output of any of the software modules comprises a response to the corresponding conversational input based on the execution instruction received by the conversation management framework 166. For example, when the execution instruction is "action: <prompt_customer>" the conversation management framework 166 determines that the output provided by the response generation LLM 164(2) comprises the response to the conversational input.

For further illustration, FIG. 5B is an exemplary table 540 of training system inputs 550(1)-550(2) and corresponding expected outputs 560(1)-560(2) used to train the NLU LLM 164(1). The training system inputs 550(1)-550(2) and corresponding expected outputs 560(1)-560(2) may be provided by the developer using, for example, the GUI 132. The table 540 comprises two training system inputs 550(1)-550(2) and two corresponding expected outputs 560(1)-560(2) for ease of understanding, and is not intended as a limitation. The example training system input 550(1) comprises a prompt-"Given the below conversation transcript and the last customer input, identify all use cases and extract all entities" and a conversation transcript. The "last customer input" is the latest conversational input received from the customer device 110(1) in the conversation. In one example the prompt is pre-defined by the developer using the GUI 132. The example expected output 560(1) comprises the use case and the entity of the conversational input.

FIG. 5C is an exemplary table 570 of training system inputs 580(1)-580(3) and corresponding expected outputs 590(1)-590(3) used to train the response generation LLM 164(2). The training system inputs 580(1)-580(3) and the corresponding expected outputs 590(1)-590(3) may be provided by the developer using, for example, the GUI 132. The table 570 comprises three training system inputs 580(1)-580(3) and three corresponding expected outputs 590(1)-590(3) for ease of understanding, and is not intended as a limitation. The example training system input 580(1) comprises a prompt-"Consider the below conversation and generate a response to present to the customer" and a conversation transcript. In one example the prompt is pre-defined by the developer using the GUI 132. The example expected output 590(1) comprises the response to the conversational input. The steps of FIG. 4 are further described and illustrated in more detail below with reference to FIGS. 6A-6D.

Figure 6A:
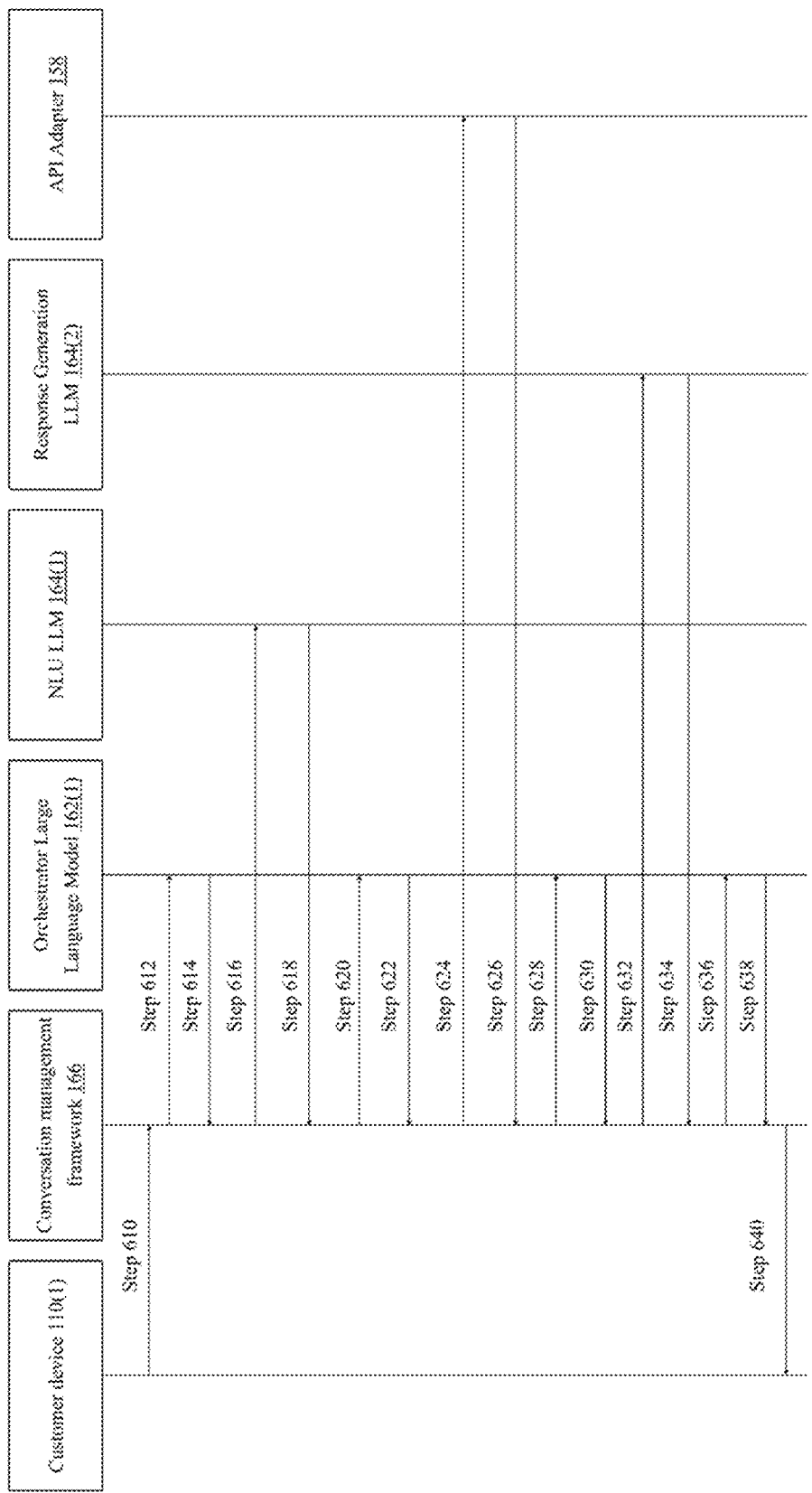
FIG. 6A is an exemplary sequence diagram illustrating the communication between the components of the virtual assistant server during a conversation with the customer accessing the customer device.
Figure 6B:
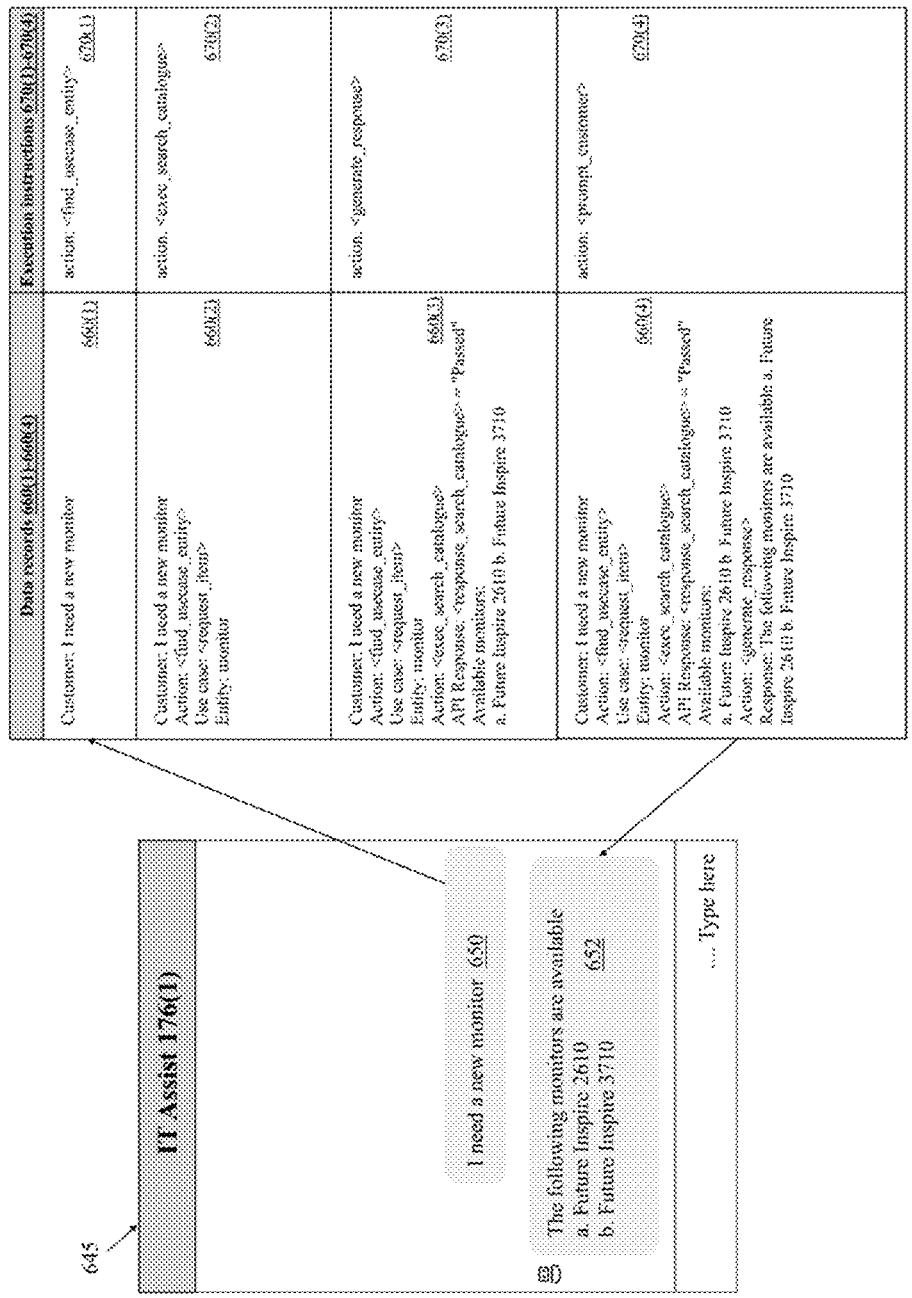
FIG. 6B is an exemplary chat window illustrating the conversation of FIG. 6A and an exemplary table of versions of data records and corresponding execution instructions created by the virtual assistant server of FIG. 1 for the conversation of FIG. 6A.

FIGS. 6A-6D illustrate examples of the steps of the method 400. FIG. 6A is an exemplary sequence diagram illustrating the communication between the components of the virtual assistant server 150 during a conversation with the customer accessing the customer device 110(1). FIG. 6B is an exemplary chat window 645 illustrating the conversation of FIG. 6A and an exemplary table of versions of data records 660(1)-660(4) and the corresponding execution instructions 670(1)-670(4) created by the virtual assistant server 150 of FIG. 1 for the conversation of FIG. 6A. FIGS. 6C-6D are exemplary tables illustrating details of the communication of the steps of the sequence diagram of FIG. 6A.

At step 610, the conversation management framework 166 of the virtual assistant server 150 receives the conversational input 650 from the customer device 110(1). The customer—an enterprise user in this example, opens the chat window 645 of the virtual assistant-IT Assist 176(1), at the customer device 110(1) and provides the conversational input 650. The conversational input 650 may be one of a plurality of conversational inputs described above at step 402. Upon receiving the conversational input 650, the conversation management framework 166 generates the version of the data record 660(1). At step 612, the conversation management framework 166 provides the version of the data record 660(1) along with a prompt defined for the orchestrator LLM 162(1)—"Given the below data record find the next best virtual assistant response," to the orchestrator LLM 162(1) as illustrated in FIG. 6C. At step 614, based on the version of the data record 660(1), the orchestrator LLM 162(1) provides the execution instruction 670(1) to the conversation management framework 166. The conversation management framework 166, based on the execution instruction 670(1)—action: <find_usecase_entity>, determines that a system input has to be provided to the NLU LLM 164(1). The system input provided to the NLU LLM 164(1) comprises a prompt which is pre-configured for the NLU LLM 164(1) and a conversation transcript generated by the conversation management framework 166.

At step 616, the conversation management framework 166 provides the system input, as illustrated in FIG. 6C, to the NLU LLM 164(1). The NLU LLM 164(1) determines the use case and entity from the conversational input 650. In one example, the NLU LLM 164(1) may determine one or more use cases or one or more entities from the conversational input 650. In another example, the NLU LLM 164(1) may determine a use case but no entity from the conversational input 650. In another example, the NLU LLM 164(1) may not determine a use case or an entity from the conversational input 650.

At step 618, the conversation management framework 166 receives the output-Use case: <request_item>, Entity: monitor, from the NLU LLM 164(1) as illustrated in FIG. 6C. Upon receiving the output from the NLU LLM 164(1), the conversation management framework 166 generates another version of the data record 660(2). At step 620, the conversation management framework 166 provides the version of the data record 660(2) along with a prompt defined for the orchestrator LLM 162(1)—"Given the below data record find the next best virtual assistant response", to the orchestrator LLM 162(1) as illustrated in FIG. 6C. At step 622, based on the version of the data record 660(2), the orchestrator LLM 162(1) provides the execution instruction 670(2) to the conversation management framework 166. The conversation management framework 166, based on the execution instruction 670(2)—action: <exec_search_catalogue>, determines that the system input comprising the use case and the entity of the conversational input 650 has to be provided to the API adapter 158.

At step 624, the conversation management framework 166 provides the use case and the entity of the conversational input 650 to the API adapter 158, as illustrated in FIG. 6C. The API adapter 158 comprises software code to convert the received use case and entity into a payload for a web request which is partially pre-configured by the developer using the service call node 360. In one example, the developer partially pre-configures: the type of web request-REST, SOAP, or the like, the HTTP method for the web request-POST, GET, PUT, PATCH, DELETE, or the like, the web request URL, or the authorization required for the web request, although the partial pre-configuration of the service call node 360 may comprise other types and/or numbers of configurations in other examples. The API adapter 158 makes the API call based on the partial pre-configuration and the data received at step 624, and receives an API response corresponding to the API call.

At step 626, the API adapter 158 provides the API response, as illustrated in FIG. 6C, to the conversation management framework 166. Upon receiving the API response from the API adapter 158, the conversation management framework 166 generates the version of the data record 660(3). At step 628, the conversation management framework 166 provides the version of the data record 660(3) along with a prompt defined for the orchestrator LLM 162(1)—"Given the below data record find the next best virtual assistant response," to the orchestrator LLM 162(1) as illustrated in FIG. 6C. At step 630, based on the version of the data record 660(3), the orchestrator LLM 162(1) provides the execution instruction 670(3) to the conversation management framework 166. The conversation management framework 166, based on the execution instruction 670(3)—action: <generate_response>, determines that a system input has to be provided to the response generation LLM 164(2).

At step 632, the conversation management framework 166 provides the system input comprising a prompt defined for the response generation LLM 164(2)—"Consider the below conversation and generate a response to present to the customer," and the conversation transcript to the response generation LLM 164(2), as illustrated in FIG. 6D. In this example, the conversation transcript is defined below:
Customer: I need a new monitor
Use case: <request_item>
Entity: monitor
API Response: <response_search_catalogue>="Passed"
Available monitors:
a. Future Inspire 2610 b. Future Inspire 3710
The response generation LLM 164(2) generates a response to present to the customer based on the system input of step 632.

At step 634, the conversation management framework 166 receives the output, as illustrated in FIG. 6D, from the response generation LLM 164(2). Upon receiving the output from the response generation LLM 164(2), the conversation management framework 166 generates the data record 660(4). At step 636, the conversation management framework 166 provides the data record 660(4) along with a prompt defined for the orchestrator LLM 162(1)—"Given the below data record find the next best virtual assistant response," to the orchestrator LLM 162(1) as illustrated in FIG. 6D. At step 638, based on the prompt and the data record 660(4) of step 636, the orchestrator LLM 162(1) provides the execution instruction 670(4) to the conversation management framework 166. The conversation management framework 166, based on the execution instruction 670(4)—action: <prompt_customer>, determines that the output of the response generation LLM 164(2) of step 634 is a response to the conversational input 650 customer device 110(1). In another example, the conversation management framework 166, based on the execution instruction 670(4)—action: <prompt_customer>, determines that the data record 660(4) comprises the response to the conversational input 650. The conversation management framework 166 may determine that the "response" section of the version of the data record 660(4) is the response to the conversational input 650.

At step 640, the conversation management framework 166 provides the determined response as a response 652 to the conversational input 650. In another example, the conversation management framework 166 provides the "response" section of the version of the data record 660(4) as a response 652 to the conversational input 650. In this manner, the conversation management framework 166 of the virtual assistant server 150 orchestrates customer conversations.

Having thus described the basic concept of the invention, it will be rather apparent to those skilled in the art that the foregoing detailed disclosure is intended to be presented by way of example only, and is not limiting. Various alterations, improvements, and modifications will occur and are intended for those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for conversation orchestration comprising:
receiving, by a conversation management framework, a plurality of conversational inputs as part of a conversation from a customer device;
generating, by the conversation management framework, a version of a data record of the conversation upon: the receiving of each of the conversational inputs; or receiving each output generated by one of a plurality of software modules communicatively coupled to the conversation management framework when the one of the software modules receives a system input from the conversation management framework, wherein the software modules comprise one or more conversational modules and one or more transactional modules;
providing, by the conversation management framework, each of the generated versions of the data record to a communication orchestrator communicatively coupled to the conversation management framework;
receiving, by the conversation management framework, for each of the generated versions of the data record, execution instructions configured as executable actions by the conversation management framework with one or more software modules from the communication orchestrator, wherein the conversation management framework is configured to communicate during the conversation with the customer device, the communication orchestrator, and the software modules comprising one or more application specific large language models and an application programming interface (API) in each of their corresponding input and output formats to provide one or more of the outputs of the software modules and wherein the communication orchestrator is a large language model trained using: a flow description comprising one or more versions of training data record; and the execution instructions correspond to the one or more versions of the training data records and comprise software code written in one or more programming languages configured to communicate with the software modules comprising the one or more conversational modules comprising the one or more application specific large language models and the one or more transactional modules comprising the API;

communicating, by the conversation management framework, with the one or more of the software modules based on the received execution instructions for each of the generated versions of the data record, wherein the communicating further comprises generating a plurality of system inputs to communicate with the one or more conversational modules and the one or more transactional modules; and providing, by the conversation management framework, based on the communicating, one or more of the outputs of the software modules to the customer device, when the one or more of the outputs comprise one or more responses to one or more of the conversational inputs, wherein at least two or more of the generated versions of the data record comprise: one or more of the conversational inputs, one or more of the execution instructions, and one or more of the outputs.

2. The method of claim 1, wherein the software modules comprise: the one or more conversational modules comprising one or more natural language understanding large language models, one or more response generation large language models, and the one or more transactional modules comprising one or more web request handling software modules.

3. The method of claim 1, wherein the execution instructions further comprising identifying, by the conversation management framework, one or more of the software modules.

4. The method of claim 1, wherein the communicating further comprises:
   determining a prompt based on which one of the software modules is a recipient of the communicating; and
   providing the determined prompt and a corresponding one of the generated versions of the data record to the recipient of the communicating.

5. The method of claim 1, wherein the one or more of the outputs comprise a use case of the one or more of the conversational inputs, one or more entities determined from the one or more of the conversational inputs, one or more web responses to one or more web requests, or the one or more responses to the one or more of the conversational inputs.

6. The method of claim 1, wherein at least two of the generated versions of the data record comprises a chronological sequence of inputs received by the conversation management framework from the customer device, the communication orchestrator, and the plurality of software modules.

7. The method of claim 1, wherein the one or more conversational modules comprise large language models and wherein the plurality of system inputs generated to communicate with the one or more conversational modules comprise one or more textual prompts and conversation context data.

8. A virtual assistant server comprising:
   one or more processors; and
   a memory coupled to the one or more processors which are configured to execute programmed instructions stored in the memory to:
   receive a plurality of conversational inputs as part of a conversation from a customer device;
   generate a version of a data record of the conversation upon: the receiving of each of the conversational inputs; or receiving each output generated by one of a plurality of software modules communicatively coupled to a conversation management framework when the one of the software modules receives a system input from the conversation management framework, wherein the software modules comprise one or more conversational modules and one or more transactional modules;
   provide each of the generated versions of the data record to a communication orchestrator communicatively coupled to the conversation management framework;
   receive for each of the generated versions of the data record, execution instructions configured as executable actions by the conversation management framework with one or more software modules from the communication orchestrator, wherein the conversation management framework is configured to communicate during the conversation with the customer device, the communication orchestrator, and the software modules comprising one or more application specific large language models and an application programming interface (API) in each of their corresponding input and output formats to provide one or more of the outputs of the software modules and wherein the communication orchestrator is a large language model trained using: a flow description comprising one or more versions of training data records; and the execution instructions correspond to the one or more training versions of the data record and comprise software code written in one or more programming languages configured to communicate with the software modules comprising the one or more conversational modules comprising the one or more application specific large language models and the one or more transactional modules comprising the API;
   communicate with one or more of the software modules based on the received execution instructions for each of the generated versions of the data record, wherein the communicate further comprises generating a plurality of system inputs to communicate with the one or more conversational modules and the one or more transactional modules; and
   provide based on the communicating, one or more of the outputs of the software modules to the customer device, when the one or more of the outputs comprise one or more responses to one or more of the conversational inputs, wherein at least two or more of the generated versions of the data record comprise: one or more of the conversational inputs, one or more of the execution instructions, and one or more of the outputs.

9. The virtual assistant server of claim 8, wherein the software modules further comprise: the one or more conversational modules comprising one or more natural language understanding large language models, one or more response generation large language models, and the one or more transactional modules comprising one or more web request handling software modules.

10. The virtual assistant server of claim 8, wherein the execution instructions further comprise instructions to identify one or more of the plurality of software modules.

11. The virtual assistant server of claim 8, wherein the communicate further comprises instructions to:
   determine a prompt based on which one of the software modules is a recipient of the communicating; and
   provide the determined prompt and a corresponding one of the generated versions of the data record to the recipient of the communicating.

12. The virtual assistant server of claim 8, wherein the one or more of the outputs comprise a use case of the one or more of the conversational inputs, one or more entities determined from the one or more of the plurality of conversational inputs, one or more web responses to one or more web requests, or the one or more responses to the one or more of the plurality of conversational inputs.

13. The virtual assistant server of claim 8, wherein at least two of the generated versions of the data record comprises a chronological sequence of inputs received by the conversation management framework from the customer device, the communication orchestrator, and the plurality of software modules.

14. The virtual assistant server of claim 8, wherein the one or more conversational modules comprise large language models and wherein the plurality of system inputs generated to communicate with the one or more conversational modules comprise one or more textual prompts and conversation context data.

15. A non-transitory computer readable medium storing instructions which when executed by one or more processors, causes the one or more processors to:
receive a plurality of conversational inputs as part of a conversation from a customer device;
generate a version of a data record of the conversation upon: the receiving of each of the conversational inputs; or receiving each output generated by one of a plurality of software modules communicatively coupled to a conversation management framework when the one of the software modules receives a system input from the conversation management framework, wherein the software modules comprise one or more conversational modules and one or more transactional modules;
provide each of the generated versions of the data record to a communication orchestrator communicatively coupled to the conversation management framework;
receive for each of the generated versions of the data record, execution instructions configured as executable actions by the conversation management framework with one or more software modules from the communication orchestrator, wherein the conversation management framework is configured to communicate during the conversation with the customer device, the communication orchestrator, and the software modules comprising one or more application specific large language models and an application programming interface (API) in each of their corresponding input and output formats to provide one or more of the outputs of the software modules and wherein the communication orchestrator is a large language model trained using: a flow description comprising one or more versions of training data records; and the execution instructions correspond to the one or more versions of the training data records and comprise software code written in one or more programming languages configured to communicate with the software modules comprising the one or more conversational modules comprising the one or more application specific large language models and the one or more transactional modules comprising the API;
communicate with one or more of the software modules based on the received execution instructions for each of the generated versions of the data record, wherein the communicate further comprises generating a plurality of system inputs to communicate with the one or more conversational modules and the one or more transactional modules; and
provide based on the communicating, one or more of the outputs of the software modules to the customer device, when the one or more of the outputs comprise one or more responses to one or more of the conversational inputs, wherein at least two or more of the generated versions of the data record comprise: one or more of the conversational inputs, one or more of the execution instructions, and one or more of the outputs.

16. The non-transitory computer readable medium of claim 15, wherein the software modules comprise: the one or more conversational modules comprising one or more natural language understanding large language models, one or more response generation large language models, and the one or more transactional modules comprising one or more web request handling software modules.

17. The non-transitory computer readable medium of claim 15, wherein the execution instructions further comprise instructions to identify one or more of the plurality of software modules.

18. The non-transitory computer readable medium of claim 15, wherein the communicate further comprises instructions to:
determine a prompt based on which one of the software modules is a recipient of the communicating; and
provide the determined prompt and a corresponding one of the generated versions of the data record to the recipient of the communicating.

19. The non-transitory computer readable medium of claim 15, wherein the one or more of the outputs comprise a use case of the one or more of the conversational inputs, one or more entities determined from the one or more of the plurality of conversational inputs, one or more web responses to one or more web requests, or the one or more responses to the one or more of the plurality of conversational inputs.

20. The non-transitory computer readable medium of claim 15, wherein at least two of the generated versions of the data record comprises a chronological sequence of inputs received by the conversation management framework from the customer device, the communication orchestrator, and the plurality of software modules.

21. The non-transitory computer readable medium of claim 15, wherein the one or more conversational modules comprise large language models and wherein the plurality of system inputs generated to communicate with the one or more conversational modules comprise one or more textual prompts and conversation context data.

\* \* \* \* \*